(12) United States Patent
Stergiades

(10) Patent No.: US 6,307,570 B1
(45) Date of Patent: Oct. 23, 2001

(54) VIRTUAL INPUT DEVICE

(75) Inventor: Andrew L. Stergiades, Boca Raton, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 08/993,746

(22) Filed: Dec. 19, 1997

Related U.S. Application Data

(60) Provisional application No. 60/042,199, filed on Mar. 31, 1997.

(51) Int. Cl.[7] .................................................. G09G 13/00
(52) U.S. Cl. ............................ 345/744; 345/156; 709/203
(58) Field of Search ...................................... 345/132, 333, 345/501, 327, 744, 746, 747, 156, 173, 357; 709/203, 204; 364/514

(56) References Cited

U.S. PATENT DOCUMENTS

| | | | | |
|---|---|---|---|---|
| 5,289,574 | * | 2/1994 | Sawyer ................................. | 395/157 |
| 5,483,466 | * | 1/1996 | Kawahara et al. ................... | 709/203 |
| 5,548,723 | * | 8/1996 | Pettus .................................. | 709/228 |
| 5,583,563 | * | 12/1996 | Wanderscheid et al. ............. | 348/13 |
| 5,625,683 | | 4/1997 | Nazanin et al. ..................... | 379/355 |
| 5,640,540 | * | 6/1997 | Ansberry et al. .................... | 395/500 |
| 5,655,218 | | 8/1997 | Smolinske ........................... | 455/566 |
| 5,684,861 | | 11/1997 | Lewis et al. ......................... | 379/59 |
| 5,918,020 | * | 6/1999 | Blackard et al. .................... | 370/395 |
| 5,928,324 | * | 7/1999 | Sloan .................................. | 709/203 |
| 5,983,273 | * | 11/1999 | White et al. ......................... | 709/229 |
| 5,999,180 | * | 12/1999 | Coskrey, IV ......................... | 345/352 |
| 5,999,950 | * | 12/1999 | Krueger et al. ...................... | 707/535 |
| 6,018,806 | * | 1/2000 | Cortopassi et al. ................... | 714/8 |
| 6,034,689 | * | 3/2000 | White et al. ......................... | 345/357 |

FOREIGN PATENT DOCUMENTS

| | | |
|---|---|---|
| 196 02 718 A1 | 7/1997 | (DE) . |
| 0 734 144 A2 | 9/1996 | (EP) . |
| WO 94/28670 | 12/1994 | (WO) . |
| WO 98/52344 | 11/1998 | (WO) . |

OTHER PUBLICATIONS

"WebTV System Guide", http//developer.webtv.net/authoring/sysgde/sysgde.html, printed Sep. 13, 2000, 12 pages.

Screenshot of calculator application that is part of Microsoft® Windows® Operating System, 1 page.

* cited by examiner

*Primary Examiner*—Chanh Nguyen
*Assistant Examiner*—Fritz Alphonse
(74) *Attorney, Agent, or Firm*—Testa, Hurwitz & Thibeault, LLP

(57) ABSTRACT

A software object and method are disclosed which allow a client node to control the display and use of a software system-level input device application on a server. The server host and executes the input device application which is "raised" and "lowered" in response to change-of-state protocol packets. The system-level input application device may provide keyboard, keypad, or other input device functionality.

19 Claims, 1 Drawing Sheet

VIRTUAL INPUT DEVICE

CROSS-REFERENCE TO RELATED APPLICATIONS

This application claims priority to co-pending provisional patent application Ser. No. 60/042,199, filed on Mar. 31, 1997, the contents of which are incorporated herein by reference.

FIELD OF THE INVENTION

The present invention relates to a method and object for controlling the execution of an application program on a server from an associated client and, in particular, to controlling the operation and display of an input device application on a server from an associated client node.

BACKGROUND OF THE INVENTION

Electronic computing devices exist that do not have traditional text input capabilities, i.e. keyboards or key number pads. Such devices may not have keyboards or number pads because of their physical size, e.g. hand-held personal digital assistants, or because it is not convenient to use the device with a keyboard, e.g. an Internet appliance which is designed to connect to a common television set and is operable only by a television remote control.

Although such devices do not have keyboards or key number pads, it is often necessary for the devices to possess traditional text input capabilities. For example, a user of an Internet appliance may need to type in a Uniform Resource Locator (URL) address in order to direct the Internet appliance to display a particular page of interest. This URL address requires alphanumeric data entry, which traditionally has been done by a keyboard.

Some information appliances attempt to solve this problem by providing a software "pop-up" keyboard. Software "pop-up" keyboards are screen displays that are local to the device and allow the user to enter alphanumeric information by navigating the screen display on the local device.

Although these software devices enable traditional text input capabilities in electronic devices lacking keyboards and key pads, because they are local to the device they: occupy the memory space of the local device, which may be limited; require complex or unwieldy screen management techniques in order to distinguish keyboard events and other program events; and are not client-node independent, which limits the number of server applications that may be able to accept input from them.

SUMMARY OF THE INVENTION

The present invention relates to a remote system level soft input object and a method for creating and managing a remote system level soft input object on a server from a client node. This allows a client node, which requires traditional text input capabilities to provide keyboard or key pad functionality to a user. In addition, because the object is created and managed on the server, local memory space is preserved for local applications, local screen management is kept simple because the local application which the user is running is never displaced by the soft input object, and the input object format may be adjusted to allow the user to communicate with the server application in a way that is familiar to the user, e.g. a QWERTY keyboard, a Dvorak-style keyboard, or a traditional keypad.

In one aspect, the invention relates to a method for controlling the display of an input device application, which is hosted by and executes on a server. The method includes the steps of receiving a change-of-state protocol packet from a client node and, in response to the protocol packet, changing the state of the input device application. The protocol packet may be a "raise display" protocol packet which causes the server to display the input device or it may be a "lower display" protocol packet which causes the server to stop displaying the input device.

In another aspect the invention relates to a method for providing input to an application which is executing on a server. The method includes the steps of receiving a change-of-state protocol packet from a client node and, in response to receiving the packet, changing the state of an input device application which is hosted by, and executes on, the server. Input is received from the client node and is interpreted as input to the input device application. The input to the input device application generates an input to the application which is running on the server.

BRIEF DESCRIPTION OF THE DRAWINGS

The invention is pointed out with particularity in the appended claims. The advantages of this invention described above, as well as other advantages, may be better understood by referring to the following description taken in conjunction with the accompanying drawings.

DETAILED DESCRIPTION OF THE INVENTION

Figure 1:
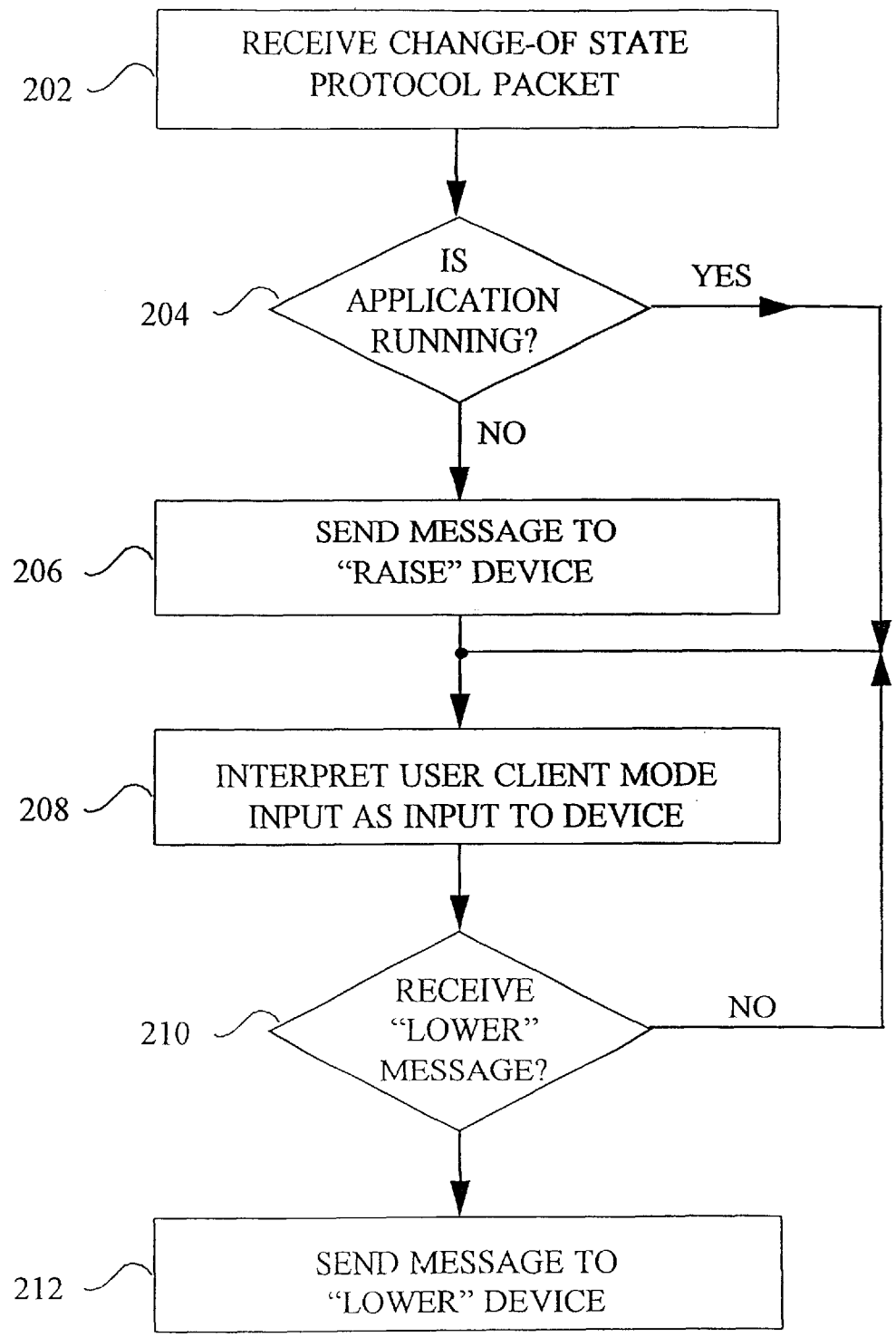
FIG. 1 is a flowchart of the steps to be taken by a server to allow a client node to control execution of an input application device.

In brief overview, a method for controlling the display of an input device application comprises the steps of receiving a change-of-state protocol packet from a client node and changing the state of an input device application running on
* 5 the server in response to the change-of-state protocol packet. When reference is made to a change-of-state protocol packet throughout the specification, it is meant to be understood that such change-of-state protocol packet may be an "on" packet or an "off" packet.

The server receives a change-of-state protocol packet which is transmitted over a network. The network may be any network which can transmit data, such as an electrical, fiber optic, or a wireless network. The client node which sends the change-of-state protocol packet may also be a client application running on a server node.

The client node may transmit a change-of-state protocol packet in response to any one of a number of inputs. For example, a "hot key" may be defined on an input device associated with the node running the client application that, when activated, sends a change-of-state protocol packet. Alternatively, a pattern of inputs, e.g. a series of mouse clicks, may be interpreted as a command to send a change-of-state protocol packet. In another embodiment, the client node may provide a user with a screen cursor that, when moved into a predefined "hot zone" of a display screen, indicates that a change-of-state protocol packet is to be sent.

Once the change-of-state protocol packet is received by the server, the server changes the state of the input device application. For cases in which an "on" change-of-state protocol packet is received, the server initiates execution of the input device application. Similarly, for cases in which an "off" change-of-state protocol packet is received, the server terminates execution of the input device application. In other embodiments, the change-of-state protocol packet may toggle the state of the input device application.

The input application device is hosted by, and executes on, the server and can be any kind of program which provides an input/output device with which the user interacts. For example, the program may be an object which responds to input and produces output, or it may be a subroutine or other traditional software implementation. The input device application may provide the user with a keyboard that is a traditional QWERTY style keyboard or it may provide the user with a keyboard in any one of a number of different standard formats, such as a Dvorak keyboard. Alternatively, the input device application may provide the user with a different form of input, such as a key pad, a series of buttons having a predefined function associated with them, or a drum-styled input display.

FIG. 1 is a flowchart of the steps to be taken by a server which allows an input device application to be controlled from a client node. A client lacking traditional text input capabilities is in communication with a server. The server executes an application for the client with which the client node interacts. When the client node needs to input text in order to interact with the application running on the server, the client node sends a change-of-state protocol packet to the server instructing the server to begin execution of an input/output application device.

The server receives the transmitted change-of-state protocol packet (step 202) and determines if it is running the appropriate input device application (step 204). The server may provide only one input device application which can be requested by the client node or the change-of-state protocol packet may include information which indicates to the server which input device application the client node requests.

If the requested input device application is not already executing on the server, the server "raises" the input device application, e.g. a keyboard, which allows the user to input alphanumeric text (step 206). "Raising" an input device application means that the server executes the input device application. When the input device application starts, it displays a graphical representation of an input device. The graphical display of the input device is transmitted to the client node. Although the server displays the input application device to the client node, the window currently accepting input, termed "having focus", is not shifted to the input application device window but remains with the application the client is running.

The input application device accepts input from the client node based on whatever input device is available to the client node. For example, if the client node has only a mouse, then the input application device can respond to the position of the cursor on the client node screen, as well as mouse clicks to indicate depressing a button of the keyboard. The server interprets the client node input as input to the input application device (step 208). This is accomplished by providing the input device application window with an attribute indicating that the input device application window is to always stay on top of z-order, i.e., it is always the top window displayed. However, the input device application window does not get the "focus" unless it receives a mouse click on its title bar. Therefore, the input device application will remain displayed over other windows even when it does not have the focus.

In other embodiments, the server may display the application to a client node having an electronic touch screen which receives client node may be provided with a graphic tablet, trackball, or light pen which may be used to interact with the input device application.

Once the client node is finished inputting text, it sends another change-of-state protocol packet to the server instructing the server to terminate execution of the input application device. When the server receives the change-of-state protocol packet (step 210), it "lowers" the input application device, which means that it stops displaying the keyboard on its screen and it terminates execution of the software program (step 212).

Having described certain embodiments of the invention, it will now become apparent to one of ordinary skill in the art that other embodiments incorporating the concepts of the invention may be used. Therefore, the invention should not be limited to certain embodiments, but rather should be limited only by the spirit and scope of the following claims.

What is claimed is:

1. A method for controlling the display of an input device provided by an input device application executing on a server comprising:
   (a) receiving on said server a raise-display protocol packet from a client node;
   (b) changing said input device application executing on said server from a current state to a second state in response to said raise-display protocol packet;
   (c) generating display data representative of an input device in response to said change in state; and
   (d) transmitting said data to said client node for display by said client of said input device.

2. The method of claim 1 further comprising displaying said input device on said client node using said transmitted data.

3. The method of claim 2 wherein said displayed input device is a QWERTY keyboard.

4. The method of claim 2 wherein said step of displaying further comprises displaying said input device in a window without focus.

5. The method of claim 4 wherein said step of displaying further comprises displaying said window without focus on top of any other windows overlapping said window without focus concurrently displayed on said client.

6. The method of claim 1 further comprising receiving input data from said client node to said input device application on said server subsequent to step (d), said input data generated on said client node by using said input device provided by said input device application executing on said server.

7. The method of claim 6 wherein said input data represents user action associated with said input device displayed on said client node.

8. The method of claim 7 further comprising converting, by said input device application, said input data representing said user action into output data representing alphanumeric characters.

9. The method of claim 8 further comprising transmitting said output data to a second application.

10. The method of claim 1 further comprising:
    receiving on said server a lower-display protocol packet from said client node;
    changing said input device application from a current state to a another state in response to said lower-display protocol packet; and
    transmitting data to said client node in response to said change in state to remove said input device displayed on said client.

11. The method of claim 10 further comprising removing said input device from a display on said client node in response to a lower-display protocol packet.

12. A method for providing input to a second application executing on a server comprising:
- (a) receiving on said server a change-of-state protocol packet from a client node;
- (b) changing an input device application executing on said server from a current state to a second state in response to said change-of-state protocol packet;
- (c) receiving input on said server from said client node, said input representing user action associated with an input device displayed on said client node provided by said input device application;
- (d) converting said received input by said input device application executing on said server to output data representing characters; and
- (e) transmitting said output data as an input to said second application in response to the converted input.

13. The method of claim 12 wherein step (a) comprises receiving on said server a raise-display change-of-state protocol packet.

14. The method of claim 13 further comprising the step of:
- (f) displaying an input device provided by said input device application on a display on said client node.

15. The method of claim 14 wherein step (f) further comprises displaying said input device in a window without focus.

16. The method of claim 12 wherein step (a) comprises receiving a lower-display change-of-state protocol packet.

17. The method of claim 16 further comprising the step of:
- f) removing an input device provided by said input device application from a display on said client node in response to the lower-display change-of-state protocol packet.

18. The method of claim 12 further comprising transmitting, by said client node, said change-of-state protocol in response to a predefined user action.

19. The method of claim 18 wherein said predefined user action is moving a screen cursor into a predefined area of the screen.

* * * * *